United States Patent

Melzig

[19]

[11] Patent Number: 6,102,543
[45] Date of Patent: Aug. 15, 2000

[54] PHOTOCHROMICALLY COLORED OBJECT

[75] Inventor: Manfred Melzig, Wessling, Germany

[73] Assignee: Optische Werke G. Rodenstock, Munich, Germany

[21] Appl. No.: 09/000,878

[22] Filed: Dec. 30, 1997

Related U.S. Application Data

[63] Continuation of application No. 08/612,879, filed as application No. PCT/DE95/00888, Jul. 10, 1995, abandoned.

[30] Foreign Application Priority Data

Jul. 10, 1994 [DE] Germany .............................. 44 23 904

[51] Int. Cl.$^7$ ................................ G02C 7/10; G02B 5/23
[52] U.S. Cl. ...................... 351/163; 252/586; 252/589; 351/162
[58] Field of Search ..................... 351/163, 164, 351/165, 162; 252/586, 589

[56] References Cited

U.S. PATENT DOCUMENTS 5,238,981  8/1993  Knowles ................... 524/110
5,244,602  9/1993  Van Gemert ................ 252/589

*Primary Examiner*—Scott J. Sugarman
*Attorney, Agent, or Firm*—Antonelli, Terry, Stout & Kraus, LLP

[57] ABSTRACT

Disclosed is an object made of plastic material, in particular a plastic ophthalmic lens, colored with at least one photochromic substance which is also excited by light in the UV range of the spectrum and has a higher absorption in the excited state, judged by the spectral light sensitivity of the human eye, than in the not excited state and to which, in addition, at least one UV absorbing material is added in such a concentration that darkening of the photochromic substance(s) is independent of the UV fraction of the excitation light.

But rather the intensity of the darkening depends on brightness, i.e. the intensity integrated over the spectral light sensitivity of the human eye $V_2$.

7 Claims, 2 Drawing Sheets

PHOTOCHROMICALLY COLORED OBJECT

This is a Con. of Ser. No. 08/612/879 filed May 28, 1996 now abandoned which is a 371 of PCT/DE95/00888 filed Jul. 10, 1995.

Description

1. Technical Field

The present invention relates to a photochromically colored object made of a plastic material.

2. State of the Art

Coloring objects made of plastic material, such as by way of illustration ophthalmic lenses, with one or several photochromic substances in order to obtain light-dependent darkening is common knowledge.

Known photochromic substances are "structured" in such a manner that they show light-dependent darkening only when exposed to UV light. Noteably, they change their structure when exposed to UV light, by way of illustration in the case of spiro compounds the molecule in the so-called spiro center "opens".

In other words, the known photochromic substances first have to be excited with UV light in order to show absorption in the visible range of the spectrum. With the known substances hitherto utilized in practice, the maximum absorption of the unexcited form lies without exception below 400 nm.

If, by way of illustration, ophthalmic lenses are colored with photochromic substances of this type, these lenses do not darken no matter how bright the light if it does not have a UV fraction. Such is, by way of illustration, the case when driving an automobile or when there is atmospheric inversion over large cities, because, due to the UV absorber in the PVB foil in the laminated glass panes respectively due to atmospheric impurities, the UV fraction of the light is filtered out, i.e, that fraction of light that conveys the substances from an unexcited state to an excited state, in which they absorb in the visible range.

Inversely, ophthalmic lenses colored with this type of substances darken too strongly if in reduced light there is a relatively high UV fraction in the visible range as is the case, by way of illustration, when there is fog in high mountains.

Therefore, the known substances hitherto utilized in practice have the drawback that they do not darken in a number of cases corresponding to the actual brightness, i.e. to the light intensity in the visible range of the spectrum.

Although from GB-PS 1 413 544 photochromic filters are known which can also be employed in sun-protection glasses, such as e.g. ski goggles, and which, due to coloring with metal dithizonates, darken by excitation with light in the visible wavelength range.

However, due to the already colored state of the metal dithizonates in the unexcited state, these photochromic filters are only suited for limited applications. In the unexcited state they only have a transmission of 25% of the visible light. Therefore, use, by way of illustration, as glasses by automobile drivers in twilight is ruled out, because such low transmission in street traffic does not meet safety standards. Moreover, there is a strong yellow coloring in the basic state which further limits the fields of application. Thus, by way of illustration absorbing glasses according to FIG. 3 of GB-PS 1 413 544 would lack the required signal-light sensitivity, because blue and green light, such as e.g. traffic lights or police lights, would be undetectable due to the absorption properties of the metal dithizonate in the corresponding wavelength.

DESCRIPTION OF THE INVENTION

The object of the present invention is to provide a photochromically colored object having not only the advantageous properties of the known spirooxazins and spiropyrans used for coloring but rather also a darkening property independent of the UV fraction of the exciting light and also showing a photochromic effect if the light only has a small or no UV fraction.

According to the present invention this object is solved by an object made of a plastic material colored with at least one photochromic substance which is excited by the light from the visible range of the spectrum as well as by the light in the UV range of the spectrum and which possesses in the excited state, judged by the light sensitivity of the human eye, higher absorption in the wavelength range of 450–650 nm due to hyperchromy and/or bathochromy respectively hypsochromy than in the unexcited state with, in addition, at least one UV-absorbing material has been added in such a concentration that darkening of the photochromic substance (s) is independent of the UV fraction of the excitation light.

For this purpose, by way of illustration, dyes having highly condensed aromatic or heteroaromatic ring systems and/or extended π-electron Systems are utilized which can have corresponding auxochromically or bathochromically acting substituents and due to their molecular structure also absorb in the visible spectral range in the unexcited form as well as in the excited form.

It is insignificant if the relative absorption maximum is shifted with excitation to the longwave or shortwave range as long as both maxima are in the visible spectral range. Decisive for darkening is noteably that the absorption percentage, i.e. the molar absorption coefficient integrated over $V_2$, of the dye or of the dye mixture is larger for the light excited forms than in the basic state.

Therefore, according to the present invention, objects are provided having dyes which absorb both in the exposed-to-light state as well as in the unexposed-to-light state in particular in the visible range of the spectrum and its darkening intensity is dependent on the brightness, i.e. the intensity integrated over the spectral light sensitivity of the human eye $V_2$, and not dependent on the intensity of the UV fraction of the ambient light.

The independency of the darkening reaction of the intensity of the UV fraction of the ambient light is achieved, in particular, by utilizing other UV absorbers than those usually used in ophthalmic lenses for protecting the plastic material from yellowing and becoming brittle.

These are, in particular, UV absorbers, the absorption of which extends into the visible wavelength range with, in particular, in 3-position phenyl substituted acrylates, such as by way of illustration the cyanoacrylic acid ethyl ester derivate of the following formula, being preferred:

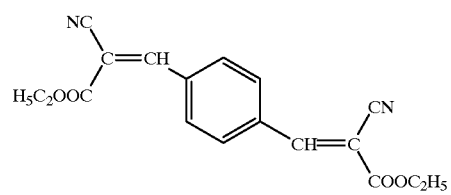

2,2', 4,4'-tetrahydroxy benzophenon ("UVinol D49") also has these properties.

These absorbers are employed in concentrations of 300–2000 ppm dependent on the plastic material used. This concentration is, like all the other following specifications, a weight specification in relation to the weight of the object.

Furthermore, long-wave absorbing benzotriazoles ("tinuvines") utilized in concentrations of 0.5–2% are suited for solving the object of the present invention.

The feature that UV-independent darkening is achieved by means of selected UV absorbers is especially advantageous, because the UV fraction of the light is not necessarily correlated to brightness as the first described examples show.

Noteably, the invented photochromically colored objects usually also have strong absorption bands in the UV range so that without UV absorbers but the same brightness in the visible range, darkening would increase in proportion to the UV fraction of the light. In other words, by way of illustration, in a design utilizing the darkening properties for wearing the glasses in the car, darkening would be "too strong" outdoors and reverse due to the UV fraction of the light.

In contrast, by means of the, according to the present invention, suited number of added UV absorbers it is achieved that the darkening intensitiy of the objects colored according to the present invention depends on the brightness, i.e. the intensity integrated over the spectral light sensitivity of the human eye $V_2$, and not on the intensity of the UV fraction of the ambient light.

Furthermore, using the described UV absorbers distinctly prolongs the usable life of the plastic objects, because the highly energetic fraction of the light filterd out by the UV absorber would damage the dyes in photochemical secondary reactions.

The invented UV absorbers can be added to the plastic material itself following usual processes or can be added at least onto the side of the plastic object exposed to light incidence, respectively applied as a layer or as an additional coating thereon.

Adding the photochromic dyes and the UV absorbers can either be carried out independently or jointly according to known procedures:

Only by way of example are EP-A-0 227 337 mentioned for adding a photochromic dye or dyes into the monomer and DE-A-3 607 759 for the subsequent addition of the dye and the UV absorber into the polymer. Adding a UV absorber or absorbers can occur in the same manner as adding the dyes.

BRIEF DESCRIPTION OF THE DRAWINGS

The present invention is made more apparent in the following using a preferred embodiment with reference to the accompanying drawings, depicting in.

DESCRIPTION OF THE PREFERRED EMBODIMENTS

In the figures, the absorption is plotted in percentage of the individual dyes and the overall absorption as the function of the wavelength of light in the visible range.

In order to produce the object, 100 g of a casting resin mixture containing 40% of diethylene glycol diacrylate, 25% of diethylene glycol dimethacrylate, 30% of triethylene glycol diacrylate and 5% of higher oligomers of the ethlyene glycol diacrylate is mixed with 0.035 g of a photochromic dye mixture and 0,050 g of 2,2',4,4'-tetrahydroxybenzophenone. After adding 1.5 g of an initiator (tert. butyl perneodeocanoate), the mixture is poured into the casting molds for plane-face lenses. For polymerization, the casting molds are put for 44 hours into a water bath, in which the temperature slowly rises from 20° C. to 80° C. Then the molds are cooled within an hour to approximately 60° C. After removal from the molds, the plane-face lenses are tempered for another 50 minutes at 115° C. in order to fully harden the objects and eliminate possible tensions.

The photochromic dye mixture applied according to the present invention contains the three dyes A, B and C. These are selected in such a manner that the overall absorption makes the ophthalmic lens look brown in the not exposed-to-light state and "brown-gray" in the exposed-to-light state.

Used as dye A is 1,3,3-triethyl-5-methoxy-6'-piperidino-spiroindolino-2,3'- (3H)anthra[2,1-b]oxazin having the following structure:

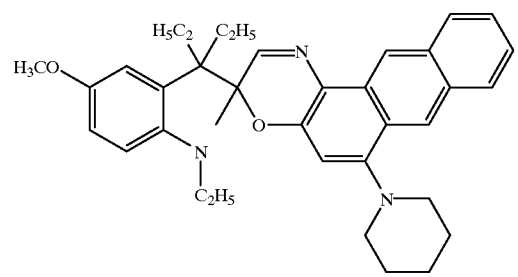

Used for dye B is 1,3,3-triethyl-5-dimethlyamino-spiroindolino-2,3'- (3H)peryleno[3,2-b]oxazin:

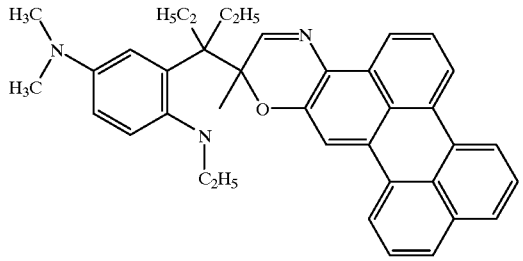

Dye C is also a spirooxazin or a substituted diaryl naphthopyran having, however, inverse photochromic properties. This means that the compound in thermal equilibrium is largely present in a long wave absorbing, open ring form and when exposed to light due to energy consumption passes into the short wave absorbing, closed form.

Figure 1:
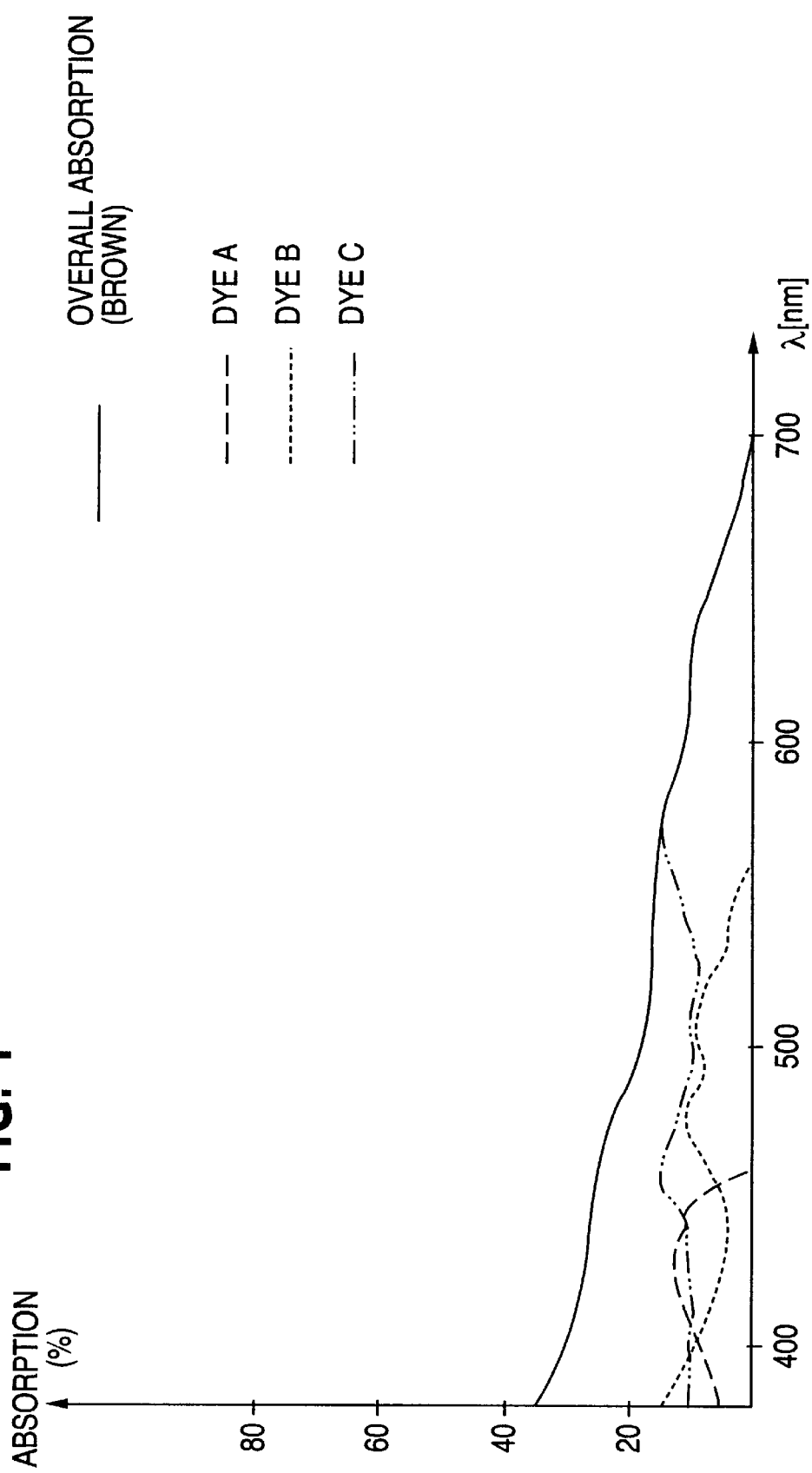
FIG. 1 an example of the absorption behavior of an object colored according to the present invention respectively of the dyes used for coloring in the not exposed-to-light state, and FIG. 2 the absorption behavior of this object respectively of the dyes used for coloring in the exposed-to-light state.
Figure 2:
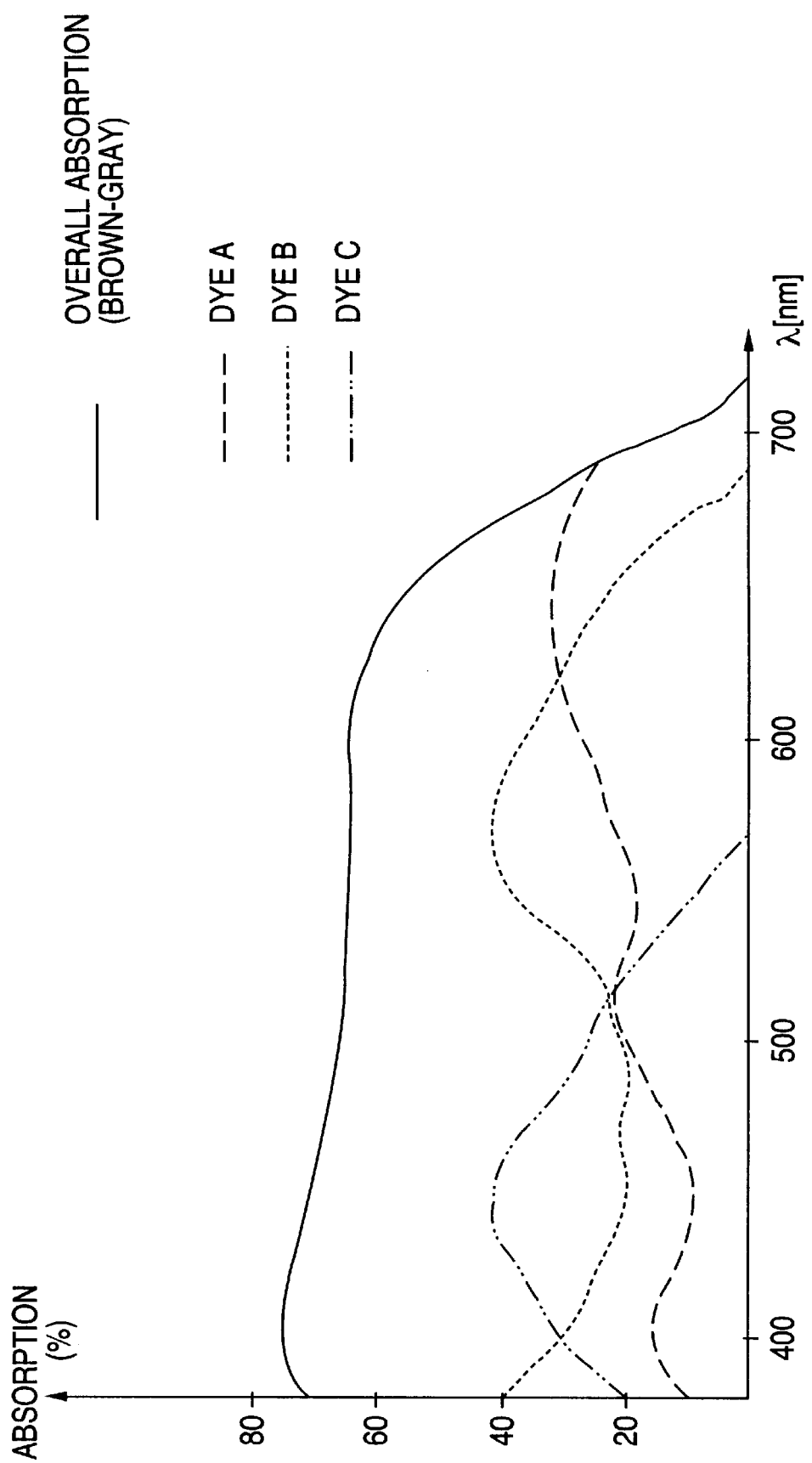

As a comparison of FIGS. 1 and 2 shows, the absorption maxima of dyes A and B are shifted to the long wavelengths by excitation by light in the visible range, whereas dye C shows a shift to the short wave range.

In particular, the figures show that the darkening intensity depends on the brightness, i.e. the intensity integrated over the spectral light sensititivity of the human eye $V_2$.

It is explicitly pointed out that the preceding example does not limit the number of dyes and plastic materials, just as there are no limitations regarding the maximum shift and the spectral range within the visible light.

Individual wishes as to the color of the plastic object in a lightened respectively darkend state are accommodated by selecting and combining the individual dyes.

What is claimed is:

1. An object made of plastic material colored with at least one photochromic substance which is conveyed from the unexcited state to the excited state by means of light in the visible range of the spectrum by absorbing light in the visible range of the spectrum, wherein said at least one photochromic substance can also be excited by light in the UV range of the spectrum, and which in the excited state, as judged by the spectral light sensitivity of the human eye, has a higher absorption in the wavelength range of 450–650 nm due to at least one of hyperchromy, bathochromy and hypsochromy than in the unexcited state, and wherein at least one UV absorbing material is added in a concentration in which darkening of the photochromic substance(s) is independent of the UV fraction of the excitation light.

2. An object according to claim 1, characterized by single dyes and/or mixtures of at least two substances being utilized for coloring.

3. An object according to claim 1 or 2, characterized by the dyes employed for coloring having highly condensed aromatic or heteroaromatic ring systems and/or extended π-systems.

4. An object made of plastic material colored with at least one photochromic substance which is conveyed from the unexcited state to the excited state by means of light in the visible range of the spectrum by absorbing light in the visible range of the spectrum, wherein said at least one photochromic substance can also be excited by light in the UV range of the spectrum, and which in the excited state, as judged by the spectral light sensitivity of the human eye, has a higher absorption in the wavelength range of 450–650 nm due to at least one of hyperchromy, bathochromy and hypsochromy, than in the unexcited state; wherein at least one UV absorbing material is added in a concentration in which darkening of the photochromic substance(s) is independent of the UV fraction of the excitation light; wherein single dyes or mixtures of two dyes are used for coloring said object made of plastic material, and the dye or dyes used for coloring have highly condensed aromatic or heteroaromatic ring systems or extended π-systems; and wherein said systems each have corresponding, auxochromically acting substituents.

5. An object according to claim 4, wherein said object contains said at least one UV-absorbing material in its overall volume.

6. An object according to claim 4, wherein the at least one UV absorbing material is added afterwards into or applied onto said object close to the surface at least one to the side through which the excitation light falls.

7. An object according to claim 6, wherein said object is an ophthalmic lens.

* * * * *